United States Patent Office 3,256,326
Patented June 14, 1966

3,256,326
BIS(12-CARBOXY-11-CARBORANYL ALKYL) ETHERS
Marvin M. Fein, Westfield, and Murray S. Cohen, Morristown, N.J., and Carl W. Nebel, Wilmington, Del., assignors to Thiokol Chemical Corporation, Bristol, Pa.
No Drawing. Filed Mar. 28, 1963, Ser. No. 269,839
6 Claims. (Cl. 260—535)

The present invention relates to novel compounds containing boron and to methods for making the same.

In recent years, there has been considerable interest in boron-containing compounds because the high heat of combustion of these compounds adapts them for use as rocket fuel. According to the present invention, boron compounds have been prepared, which compounds are useful for the preparation of polymeric materials that have exceptional value as propellant binders. Moreover, the compounds of the present invention are themselves useful as high-energy fuels and as fuel additives or as intermediates for the preparation of such fuels or additives. Solid products of this invention, either per se or after formation into a polymer, can be used as solid propellants for rocket plants and other jet-propelled devices when mixed with suitable oxidizers such as ammonium, potassium, or sodium perchlorates, ammonium nitrate, etc. Such propellant mixtures are compounded by a number of techniques known to the art. For example, the mixtures may comprise from 5 to 35 parts by weight of boron-containing materials and from 65 to 95 parts by weight of solid oxidizing agents mixed therewith. In some cases the propellant may also be made by combining the boron compounds and oxidizers with a curable polymer, for example, of the polyethylene, polyurethane, or polyester types.

Other products of the invention may be used as additives in high energy liquid fuels by mixing the products with combustible liquids such as compatible hydrocarbon fuels.

The boron-containing compounds of the invention may all be considered derivatives of carborane, which is a compound of carbon, hydrogen and boron, having the empirical formula $C_2H_{12}B_{10}$. Carborane is a solid material melting at 287°–288° C. It is characterized by a surprisingly stable nuclear structure and two labile hydrogen atoms, one connected to each carbon atom. It may be conveniently represented by using the formula H$\theta$H. While there is some difference of opinion as to the molecular structure of carborane, its stability is usually attributed to a basket-shaped molecular configuration in which the ten boron atoms and two carbon atoms may be arranged at the apices of an icosahedron.

The method of the present invention comprises reacting one or more bis(11-carboranylalkyl)ethers of the formula

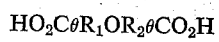

wherein $R_1$ and $R_2$ are alkylene groups, with an organolithium compound in a solvent medium. The labile hydrogen atoms on the bis(11-carboranylalkyl) group are replaced by lithium atoms. Thereupon, the lithium-substituted ether may be reacted with carbon dioxide gas to form a compound of the formula $$LIO_2C\theta R_1OR_2\theta CO_2Li$$

wherein $\theta$ is $C_2H_{10}B_{10}$ or

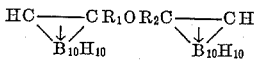

with the two carbon atoms are numbered 12 and 11 as indicated, and the localized pi-bonding as shown between the carbon and boron atoms. The salt may be converted to the corresponding diacid, for example by treatment with an acidifying agent. The diacid is of the formula $$HO_2C\theta R_1OR_2\theta CO_2H$$

The method of the present invention can be illustrated by reference to the use of bis(11-carboranylalkyl)ethers with alkyl groups having 1 to 4 carbon atoms as starting materials. In the resulting di-acid products, $R_1$ and $R_2$ are then defined as alkyl groups having from 1 to 4 carbon atoms. For example, bis(11-carboranylmethyl) ether is reacted with an organo-lithium compound replacing labile hydrogens on the 11-carboranylmethyl groups with lithium atoms to form bis(12-lithium-11-carboranylmethyl)ether. The lithium-substituted ether is then reacted with carbon dioxide gas. When the product of this latter reaction is hydrolyzed, a compound of the formula $$(HO_2C\theta CH_2)O$$

is formed.

The preparation of the pertinent bis(11-carboranylalkyl)ethers is described in the co-pending Fein et al. application Serial No. 269,848 filed March 28, 1963. That preparation comprises reacting an alkyl ether containing acetylenic bonds with a co-ordination compound of acetonitrile. This co-ordination compound is suitably formed by reacting two moles of ethyl sulfide or acetonitrile, which are basic materials in the sense that they can donate electrons to aid formation of a chemical bond, with decaborane. This latter reaction is suitably carried out in an inert solvent medium such as one consisting of one-half dioxane and one-half toluene. The acetylenic ether is conveniently added to the solution of the co-ordination compound and the synthesis of the bis(11-carboranylalkyl)ether is carried out directly in the same solvent medium.

The reaction between the bis(carboranylalkyl) ether and the organo-lithium compound suitably proceeds at room temperature (20°–30° C.), but is conveniently performed at temperatures below room temperature for ease in controlling reaction rate or maintaining volatile reactants or solvents in the convenient condensed form. The reaction may proceed between the reactants directly, or in solution in an organic solvent inert to the reaction. Conventional aliphatic, cycloaliphatic aromatic hydrocarbon and oxygenated solvents such as benzene, toluene, cyclohexane, hexane, heptane, dioxane, ethers, etc. can be employed, as will be evident to the skilled organic chemist. Because of the sensitivity of the organolithium compounds to hydrolysis, highest yields are obtained when anhydrous conditions are maintained, for example by exclusion of atmospheric moisture by operating in an atmosphere of an inert gas such as nitrogen, argon, or the like.

The reaction of the lithiated ether with carbon dioxide similarly suitably proceeds at room temperature or below to permit better control or to increase the solubility of the gas in solution of the lithiated ether reagent.

The acetylenic ether, and the bis(carboranylalkyl)ether reaction product, may be symmetrical or asymmetrical. Ethers with straight aliphatic chains are preferred over those with excessively branched chains because of the greater probability of steric hindrance of the reactions with the latter materials. Bis(carboranylalkyl)ethers derived from diacetylenic ethers with lower alkyl chains having 1 to 4 carbon atoms are particularly suitable for use in the present invention and bis(11-carboranylmethyl) ether is preferred.

The organo-lithium compound used in the method of the present invention is an alkyl lithium or aryl lithium compound such as butyl lithium, ethyl lithium, phenyl lithium, or other organo lithium compounds known in the art and derived by replacement of a hydrogen atom of an alkyl or aryl compound by a lithium. The choice of organo-lithium material is not critical and is dependent on convenience of handling and economic factors. In all cases, the reactants are suitably maintained in contact for a time permitting substantially complete reaction. The reaction time is not critical, and will vary with the reaction temperature, concentration, etc. as is usual in chemical reactions.

The hydrolysis step may be performed with a variety of acids, both organic and inorganic, since the acid serves merely as a source of hydrogen ions. Hydrochloric acid is readily available and suitable to the method of the present invention, but, as known in the art, any acid which is a stronger acid than the weak carboxylic acid product can be used to displace the acid product from its lithium salt.

In order to point out more fully the nature of the present invention, the following specific example is given as an illustrative embodiment of the present process and products produced thereby.

EXAMPLE 0.052 mole of bis(11-carboranylmethyl)ether was slurried into 110 ml. of anhydrous diethyl ether. The slurry was added, with stirring, at 0°–15° C. to a mixture consisting of 100 ml. of 1.83 molar butyl lithium in heptane and 150 ml. of anhydrous diethyl ether. The following reaction took place:

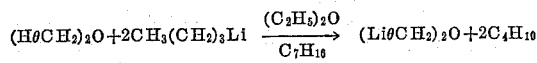

The dilithium ether was then treated with gaseous carbon dioxide at 0°–10° C., whereupon the following reaction took place:

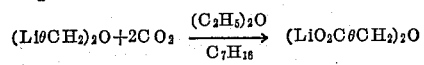

Treatment with hydrochloric acid resulted in a hydrolysis of the reaction product:

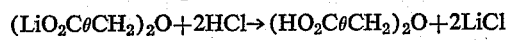

The product was extracted from the aqueous hydrochloric acid solution with diethyl ether. The yield of product was 27.49 grams, which was stripped of volatile components under vacuum.

If desired, further purification of the product can be effected by washing with toluene, treating with a 10% aqueous solution of sodium hydroxide to form the water-soluble salt of the product, extracting organic materials from the solution of the sodium salt with toluene, and reforming the free acid product by treatment with HCl. Alternatively, the product can be recrystallized from benzene-ethyl acetate for obtaining high purity.

The melting point of pure bis(12-carboxy-11-carboranylmethyl)ether is 235.5° C. The infra-red spectrum of the product is consistent with the proposed structure.

It is, of course, understood that the foregoing example is intended to be illustrative and that numerous changes can be made in the ingredients, proportions, and conditions set forth therein without departing from the spirit of the invention as defined in the appended claims.

We claim:
1. A product of the formula

$$HO_2CC_2H_{10}B_{10}R_1OR_2C_2H_{10}B_{10}CO_2H$$

wherein $R_1$ and $R_2$ are alkylene groups.

2. A product of the formula $$HO_2CC_2H_{10}B_{10}R_1OR_2C_2H_{10}B_{10}CO_2H$$

wherein $R_1$ and $R_2$ are alkylene groups having 1 to 4 carbon atoms.

3. A product of the formula $(HO_2CC_2H_{10}B_{10}R)_2O$ wherein R is an alkylene group having 1 to 4 carbon atoms.

4. A product of the formula $(HO_2CC_2H_{10}B_{10}CH_2)_2O$.

5. A product of the formula $$LiO_2CC_2H_{10}B_{10}R_1OR_2C_2H_{10}B_{10}CO_2Li$$

wherein $R_1$ and $R_2$ are alkylene groups.

6. A product of the formula $$LiC_2H_{10}B_{10}R_2OR_3C_2H_{10}B_{10}Li$$

wherein $R_2$ and $R_3$ are alkylene groups.

References Cited by the Examiner

UNITED STATES PATENTS 3,167,584   1/1965   Ager et al. _____ 260—526

LORRAINE A. WEINBERGER, *Primary Examiner.*

CARL D. QUARFORTH, *Examiner.*

L. A. SEBASTIAN, A. P. HALLUIN,
*Assistant Examiners.*